United States Patent
Shipp et al.

(10) Patent No.: US 11,139,677 B1
(45) Date of Patent: Oct. 5, 2021

(54) EMERGENCY LIGHTING SYSTEM AND RELATED DEVICES AND METHODS

(71) Applicants: Peter Shipp, Winter Park, FL (US); Keith W. Andrews, Heathrow, FL (US)

(72) Inventors: Peter Shipp, Winter Park, FL (US); Keith W. Andrews, Heathrow, FL (US)

(73) Assignee: Zio Holdings, LLC, Winter Park, FL (US)

( * ) Notice: Subject to any disclaimer, the term of this patent is extended or adjusted under 35 U.S.C. 154(b) by 0 days.

(21) Appl. No.: 16/215,445

(22) Filed: Dec. 10, 2018

Related U.S. Application Data

(63) Continuation of application No. 15/953,042, filed on Apr. 13, 2018, now abandoned.

(60) Provisional application No. 62/485,121, filed on Apr. 13, 2017.

(51) Int. Cl.
  *H02J 9/02* (2006.01)
  *H05B 47/10* (2020.01)

(52) U.S. Cl.
  CPC .............. *H02J 9/02* (2013.01); *H05B 47/10* (2020.01)

(58) Field of Classification Search
  CPC .................. H02J 9/00; H02J 9/02; H02J 9/04
  USPC ...................................... 315/86; 307/64, 66
  See application file for complete search history.

(56) References Cited

U.S. PATENT DOCUMENTS

| | | | | |
|---|---|---|---|---|
| 2,106,968 A | * | 2/1938 | Dannheiser | H02J 9/02 307/23 |
| 4,486,689 A | * | 12/1984 | Davis | H05B 41/46 315/92 |
| 5,889,468 A | * | 3/1999 | Banga | G08B 27/006 340/628 |
| 6,502,044 B1 | * | 12/2002 | Lane | H02J 9/02 702/63 |
| 8,077,028 B2 | * | 12/2011 | Lane | G08B 29/02 340/524 |
| 10,461,573 B2 | * | 10/2019 | Frankland | H02J 7/0068 |
| 10,547,205 B2 | * | 1/2020 | Mishra | H05B 47/105 |
| 2002/0047627 A1 | * | 4/2002 | Pickering | H02J 9/065 315/291 |
| 2008/0191628 A1 | * | 8/2008 | Marques | H05B 37/04 315/86 |
| 2016/0309570 A1 | * | 10/2016 | Han | H05B 33/0815 |

* cited by examiner

*Primary Examiner* — Crystal L Hammond
(74) *Attorney, Agent, or Firm* — Allen, Dyer, Doppelt & Gilchrist, P.A.

(57) ABSTRACT

Unsafe restoration of normal lighting is prevented using a reset control communicating with an emergency condition detector and emergency lighting controller in a lighting system. The reset control can be integrated into other system components, like the emergency condition detector, or retrofit into an existing lighting system and configured to work with different types of emergency condition detectors and lighting controllers.

3 Claims, 7 Drawing Sheets

EMERGENCY LIGHTING SYSTEM AND RELATED DEVICES AND METHODS

CROSS-REFERENCE TO RELATED APPLICATION

This application is a continuation of U.S. Non-Provisional patent application Ser. No. 15/953,042, filed on Apr. 13, 2018 (now abandoned), which claims the benefit of U.S. Provisional Patent Application Ser. No. 62/485,121, filed on Apr. 13, 2017, the contents of which application are herein incorporated by reference in their entirety.

FIELD OF THE INVENTION

The present invention relates to emergency lighting systems, and more particularly for systems and methods for controlling the activation and deactivation of emergency lighting.

BACKGROUND OF THE INVENTION

As the name suggests, emergency lighting systems provide lighting under emergency conditions; for instance, when normal electrical power is lost or a fire alarm is activated. Such systems will typically incorporate one or more control devices for detecting the initiation of the emergency condition (e.g., loss of normal power) and automatically activating emergency lighting. The activation of emergency lighting will typically involve an increase of lighting levels and, where some or all of the emergency lights are also a part of the normal lighting system, transfer of lighting power to an emergency source (e.g., batteries). When the control device detects that the emergency condition has ended (e.g., restoration of normal power), lighting will typically be restored to normal levels and power supply.

This manner of emergency lighting control can sometimes result in unsafe conditions. For example, where normal lighting levels are quite dim, automatic restoration of normal lighting levels can effectively leave building occupants blind until their eyes adjust to the lower lighting levels. Where such occupants are up and moving—often in response to notification of the emergency condition that triggered emergency lighting in the first place—a sudden decrease in light levels can readily result in trips, falls and other accidents. Some attempts have been made to address this problem by requiring a manual input prior to the system restoring normal lighting after detecting an end to the emergency condition. While such systems have proved useful, further improvements are possible.

SUMMARY OF THE INVENTION

In view of the foregoing, it is an object of the present invention to provide an improved emergency lighting system, along with related devices and methods. These and other objects, aspects and advantages of the present invention will be better appreciated in view of the drawings and following detailed description of preferred embodiments.

DETAILED DESCRIPTION OF PREFERRED EMBODIMENTS

Figure 1:
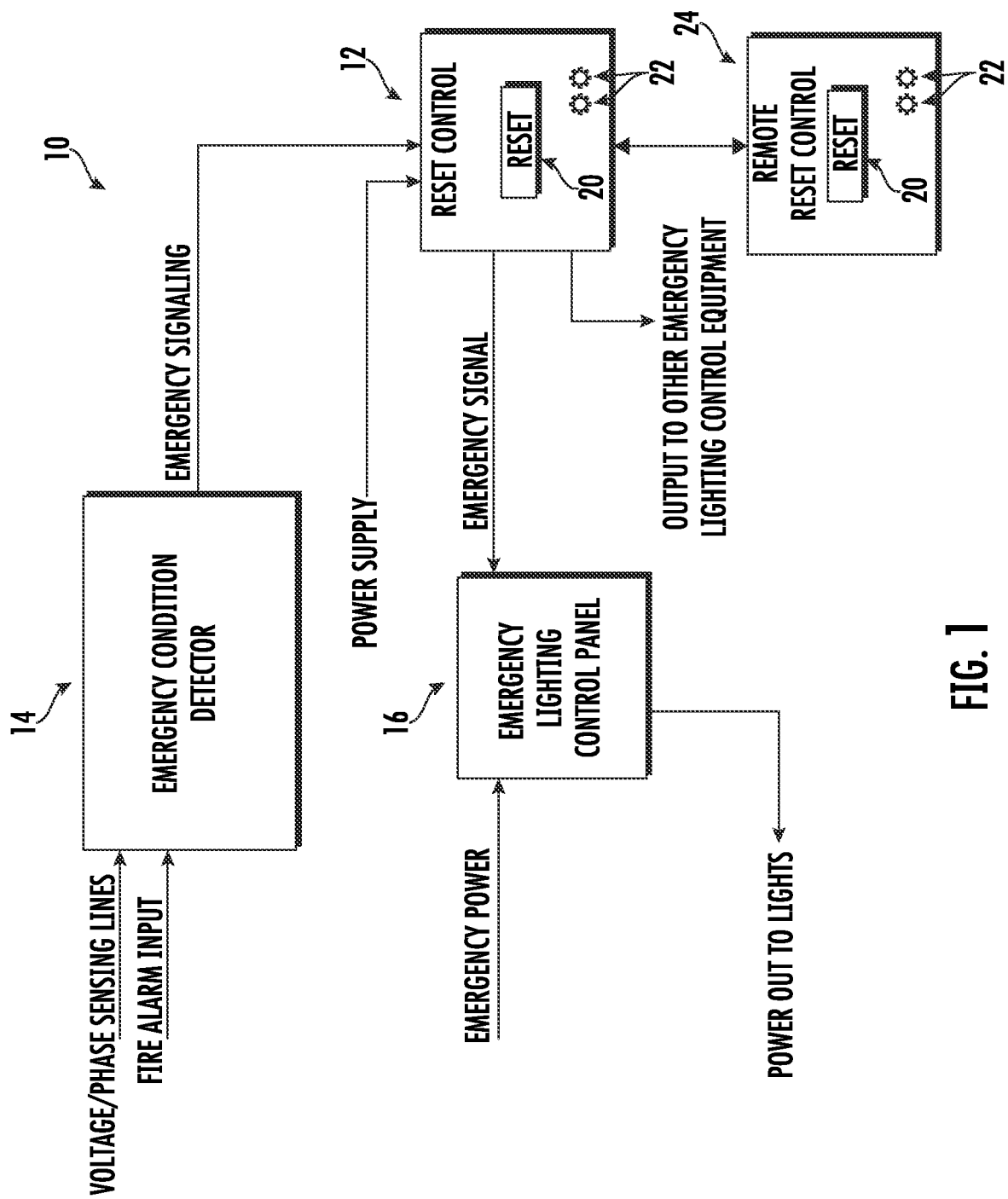
FIG. 1 is a schematic overview of an emergency lighting system including a reset control, according to an embodiment of the present invention.

Referring to FIG. 1, according to an embodiment of the present invention an emergency lighting system 10 includes a reset control 12 arranged in the path of a emergency output from an emergency condition detector 14 and a lighting control panel 16. Upon detection of an emergency condition, the detector 14 adjusts the emergency output accordingly, which is passed along to the control panel 16 through the reset control 12. Upon detecting restoration of normal conditions, the detector 14 readjusts the emergency output accordingly. However, the reset control 12 maintains the emergency output in a state corresponding to the existence of emergency conditions until a manual reset 20 is actuated. Consequently, normal lighting conditions are prevented from being inadvertently reestablished until a judgment has made that it is safe to do so.

In addition to the emergency output from the emergency condition detector 14, the reset control 12 also receives a reference voltage input; preferably, including a predetermined DC voltage (e.g., 24 VDC) connection and a common connection. In addition to the manual reset 20, the reset control 12 preferably also includes visual status indicators 22. In addition to selectively relaying the emergency output from the detector 14, the manual reset 20 can generate control outputs for one or more lighting systems that are not configured to receive and use the same emergency output. For increased flexibility of use, the reset control 12 advantageously interfaces with one or more remote units 24, each also including a manual reset 20 and indicators 22. The remote unit(s) 24 can be wireless or wired.

As a failsafe, the control panel 16 is preferably configured such that a shift to emergency lighting operation is automatically triggered when the emergency output is lost or drops below a threshold value (as well if the circuit 16 ever loses communication with the normal/power control devices). Additionally, operation of the manual reset 20 when the emergency output from the detector 14 is missing cannot inadvertently result in an attempted shift back to normal power/control.

While the reset control 12 is schematically depicted as a separate component, it will be appreciated that its functions could be incorporated into another component, such as the emergency condition detector 14. However, the ability to accept inputs at the reset control 12 from more than one type of emergency condition detector in the depicted embodiment is particularly advantageous as a retrofit or add-on to existing lighting systems. Different existing lighting system components might use different types of emergency outputs, and the reset control 20 readily permits compatibility with the different types of lighting system components.

The emergency condition detector 14 can be configured to detect multiple emergency conditions and modify the emergency output accordingly. For example, the detector 14 can also include a fire alarm input, allowing emergency lighting to be activated in a fire or other emergency situation prior to any loss of electrical power resulting therefrom. Other advantageous examples of additional inputs include a manual emergency indication switch and an emergency condition signal from an amusement ride control system.

Figure 2:
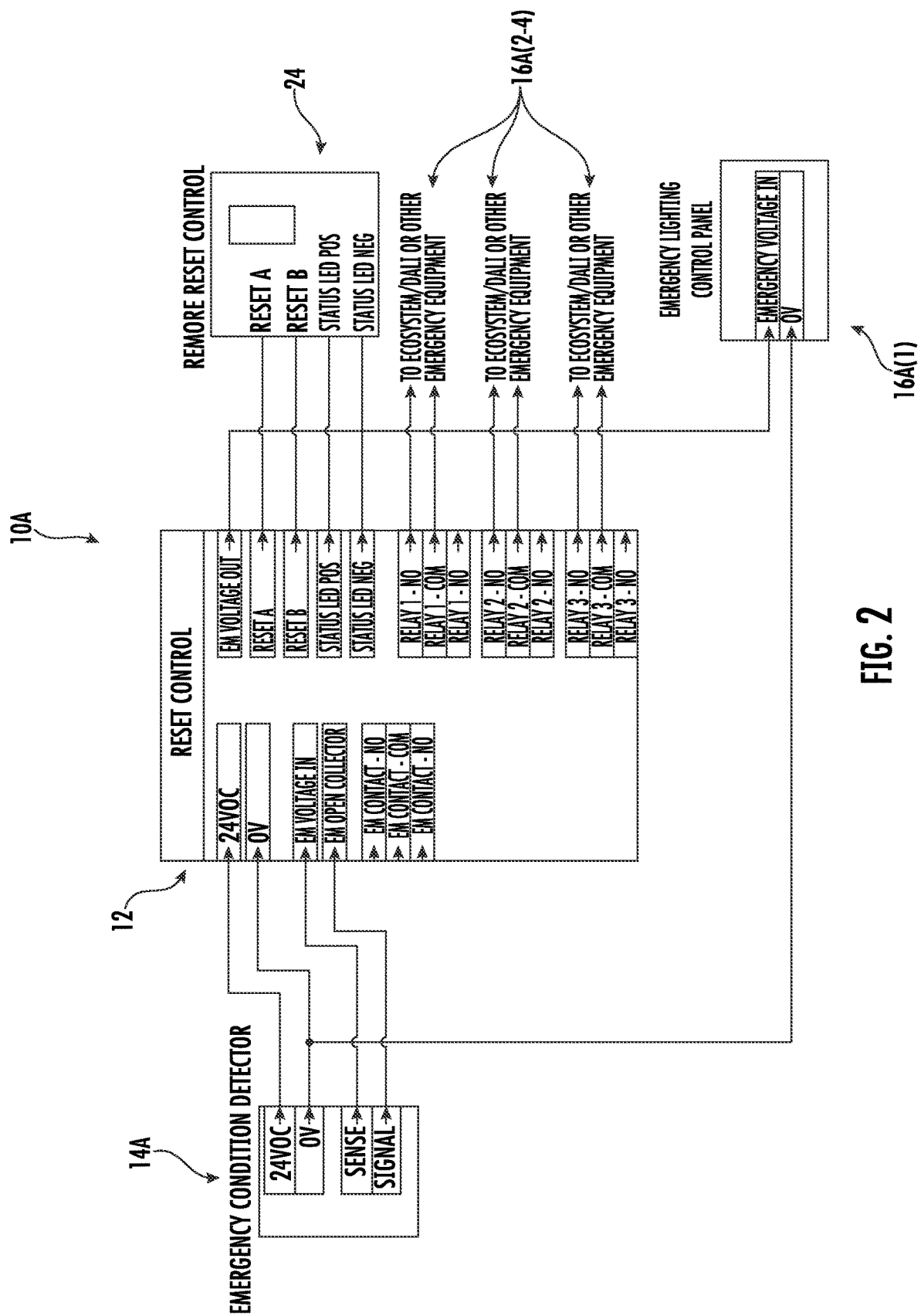
FIG. 2 is a schematic overview of an emergency lighting system including the reset control of FIG. 1, while utilizing particular preexisting components as inputs and outputs.
Figure 3:
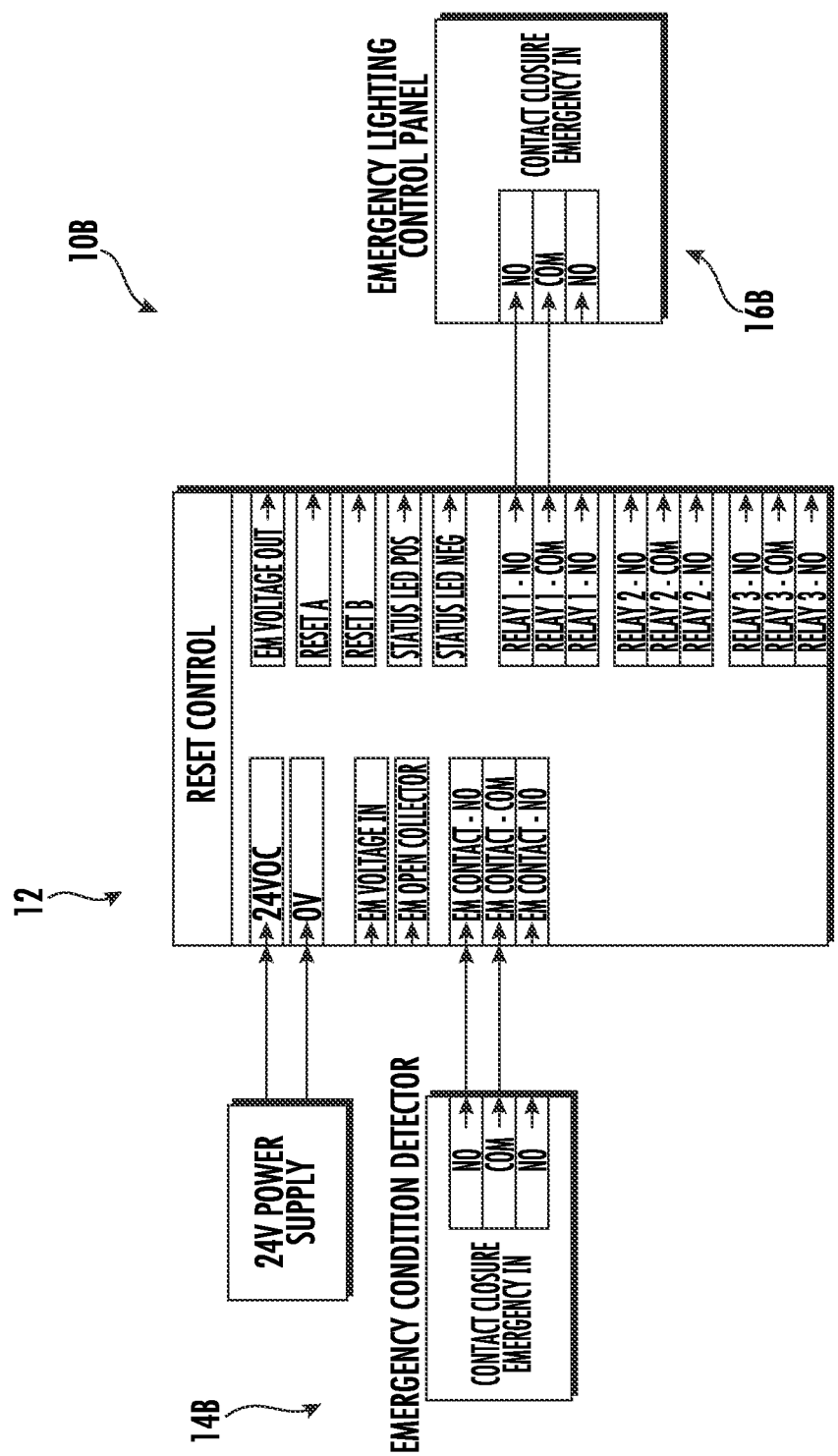
FIG. 3 is a schematic overview of an emergency lighting system including the reset control of FIG. 1, while utilizing different preexisting components than the system of FIG. 2.

As noted above, the reset control 12 can be used in connection with different types of emergency condition detectors and/or different types of lighting system components. Referring to FIG. 2, in a system 10A, the reset control 12 receives sense and/or signal outputs as the emergency output(s) from an emergency condition detector 14A, and supplies appropriate emergency outputs to control panel 16A(1), as well as other lighting system components 16A(2-4) (described in greater detail below). In FIG. 3, a system 10B includes a contact closure-type emergency condition detector 14B, which is connected with the reset control 12 (remote unit 24 not shown for efficiency of illustration), as well as a separate DC power supply. The output of the reset control 12 is again able to supply the appropriate output to a control panel 16B that functions with a contact closure-type detector.

Figure 4A:
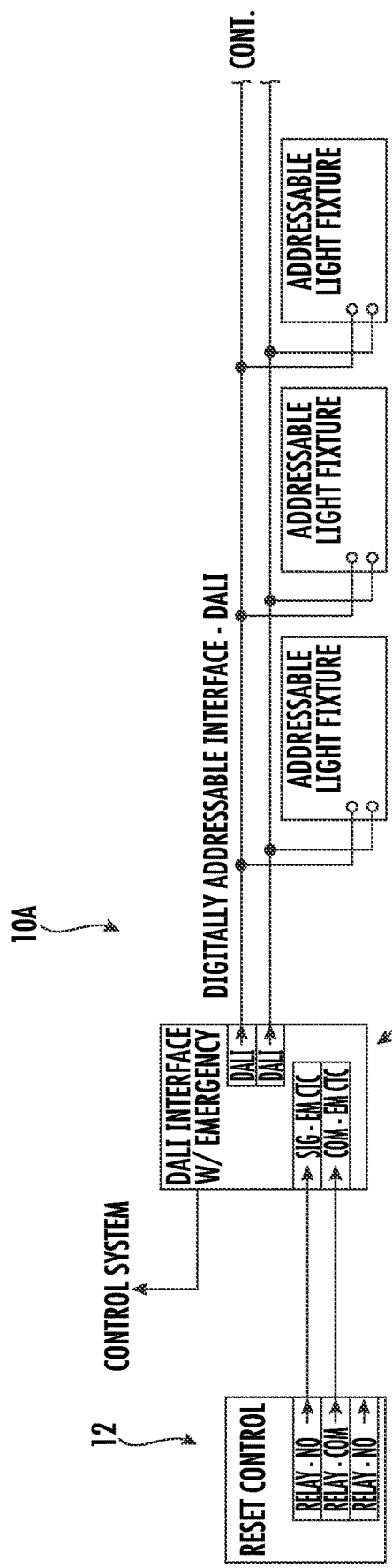
FIGS. 4A-4C are detailed views of portions of the system of FIG. 2, showing the connection between the reset control and outputs to different types of components.
Figure 4B:
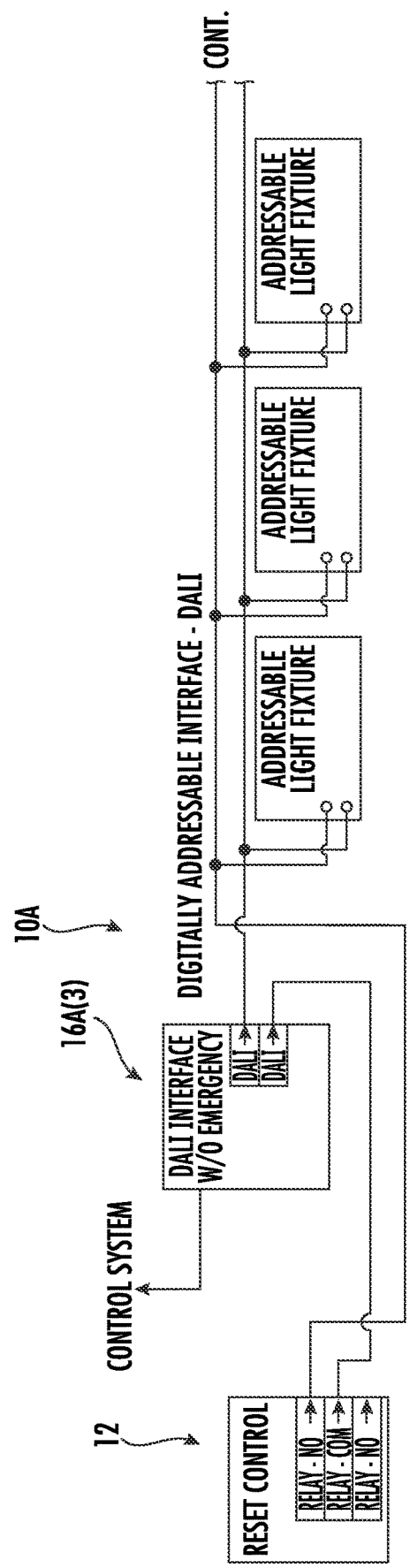
Figure 4C:
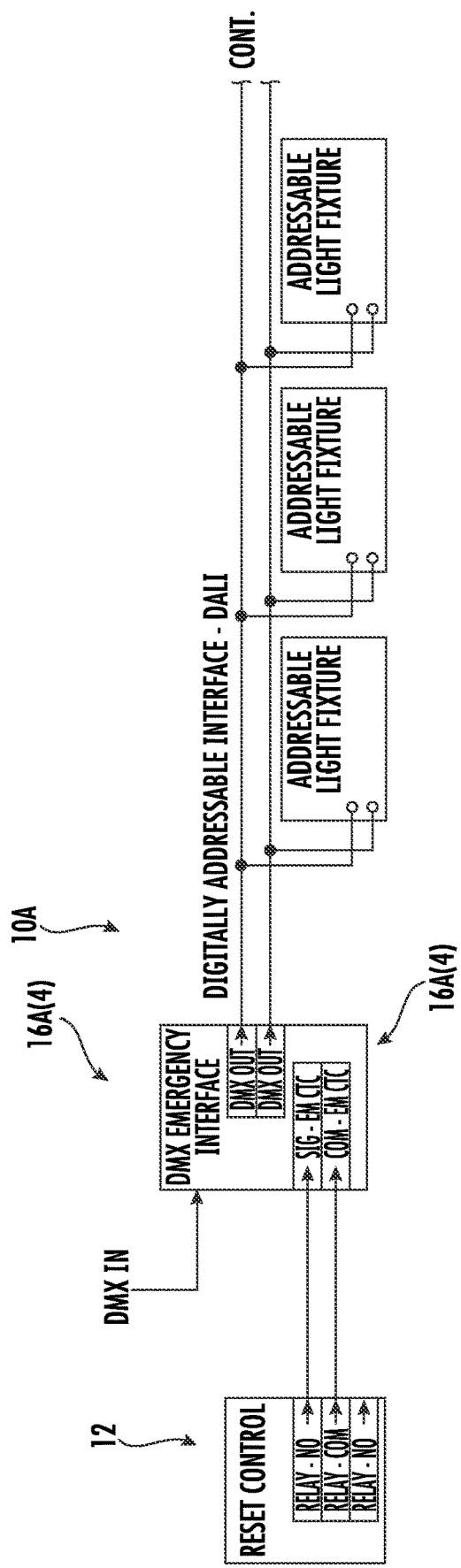
Figure 5:
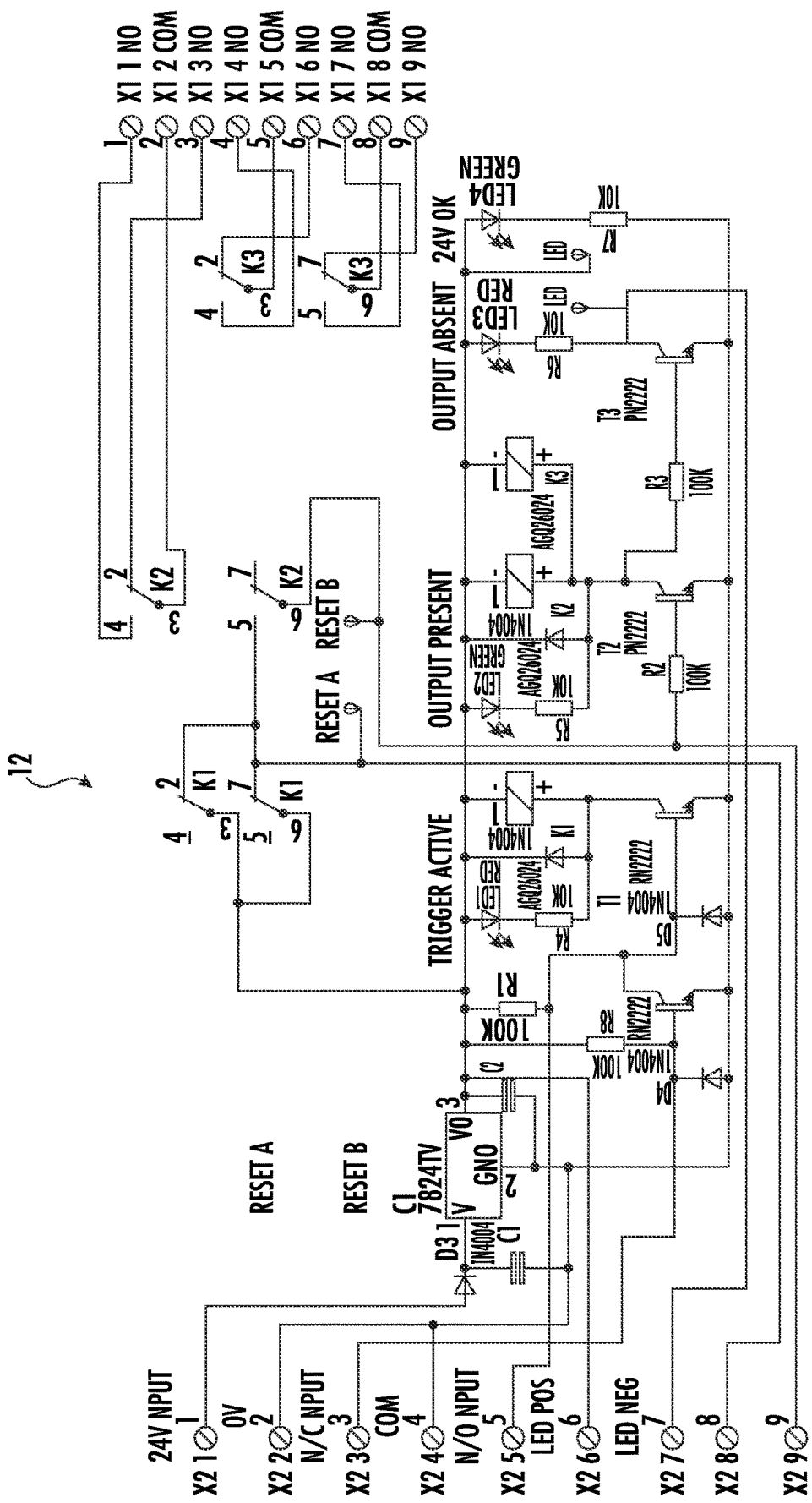
FIG. 5 is a circuit schematic for the reset control of FIG. 1.
Figure 6:
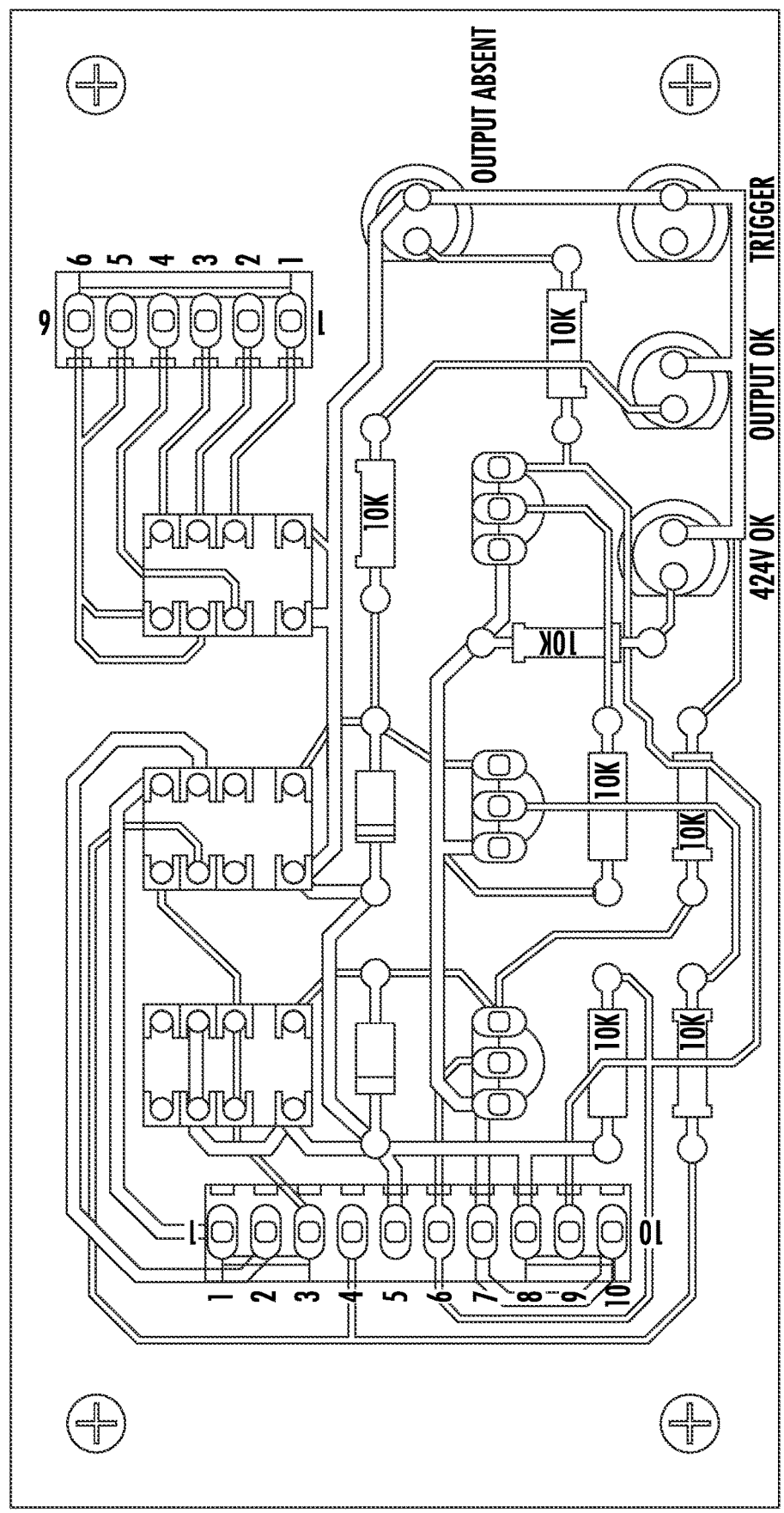
FIG. 6 is a circuit board layout for the reset control of FIG. 1.

FIGS. 4A-4C illustrate the compatibility of the reset control 12 (in the context of the system 10A of FIG. 2) with different types/configurations of lighting system components 16A (2-4). FIG. 5 is an exemplary circuit schematic for the reset control 12 and FIG. 6 is an exemplary circuit board layout for the resent control 12.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described.

What is claimed is:

1. A lighting system comprising:
a plurality of light fixtures;
a normal power supply for powering at least a first portion of the plurality of light fixtures;
an emergency power supply for powering at least a second portion of the plurality of light fixtures;
an emergency condition detector configured to detect a loss of the normal power supply;
an emergency lighting controller in communication with the emergency condition detector and configured to:
supply power from the emergency power supply to the second portion of the plurality of light fixtures upon detection of the loss of the normal power supply; and
restore power from the normal power supply to the first portion of the plurality of light fixtures;
a reset control in communication with the emergency lighting controller and the emergency condition detector, the reset control having a manual reset input configured to prevent restoration of power from the normal power supply to the first portion of the plurality of light fixtures until the manual reset input is received.

2. The lighting system of claim 1, wherein the reset input is integrated into a common housing with the emergency condition detector.

3. The lighting system of claim 1, wherein the reset input and the emergency condition detector are arranged in different housings.

* * * * *